US011524742B2

(12) United States Patent
Heredia Martinez

(10) Patent No.: US 11,524,742 B2
(45) Date of Patent: Dec. 13, 2022

(54) PORTABLE ELECTRIC VEHICLE WITH ARTICULATED WHEELS

(71) Applicant: Ford Global Technologies, LLC, Dearborn, MI (US)

(72) Inventor: German Homero Heredia Martinez, Chihuahua (MX)

(73) Assignee: FORD GLOBAL TECHNOLOGIE, LLC, Dearborn, MI (US)

( * ) Notice: Subject to any disclaimer, the term of this patent is extended or adjusted under 35 U.S.C. 154(b) by 720 days.

(21) Appl. No.: 16/087,639

(22) PCT Filed: Jun. 17, 2016

(86) PCT No.: PCT/US2016/037981
§ 371 (c)(1),
(2) Date: Sep. 22, 2018

(87) PCT Pub. No.: WO2017/164899
PCT Pub. Date: Sep. 28, 2017

(65) Prior Publication Data
US 2020/0298926 A1 Sep. 24, 2020

Related U.S. Application Data

(60) Provisional application No. 62/312,001, filed on Mar. 23, 2016.

(51) Int. Cl.
*B62K 11/00* (2006.01)
*B62J 43/28* (2020.01)
(Continued)

(52) U.S. Cl.
CPC ............... *B62K 11/007* (2016.11); *B62J 6/02* (2013.01); *B62J 25/08* (2020.02); *B62J 43/10* (2020.02);
(Continued)

(58) Field of Classification Search
CPC .............. B62J 43/28; B62J 43/10; B62J 25/08
(Continued)

(56) References Cited

U.S. PATENT DOCUMENTS 7,717,200 B2 * 5/2010 Kakinuma ............. B62D 61/00
180/218
8,540,252 B2 * 9/2013 Arjomand ............. B62K 3/002
280/30
(Continued)

FOREIGN PATENT DOCUMENTS

CN 102514662 A 6/2012
CN 104494750 A 4/2015
(Continued)

OTHER PUBLICATIONS

Russian Office Action dated Oct. 16, 2019 re Appl. No. 2018135608/11; Non-English.
(Continued)

*Primary Examiner* — Jacob B Meyer
*Assistant Examiner* — Hosam Shabara
(74) *Attorney, Agent, or Firm* — Brandon Hicks; Bejin Bieneman PLC

(57) ABSTRACT

An electric vehicle includes a stem and a base with wheels. The base is at a first end of the stem, with symmetrical elements of the base opposed across a stem axis. Elements on each side include a wheel, a drive motor, a platform and pivot joints. The wheel has an axis of rotation. The drive motor is connected to the wheel. The platform is between the wheel and the stem. A first pivot joint connects the stem and the platform. A second pivot joint connects the platform and the wheel. In a first orientation, the platforms are substantially perpendicular to the stem and in a second orientation the platforms are substantially parallel to the stem. The wheel axes are substantially parallel to each other and are
(Continued)

substantially perpendicular to the stem axis in the first orientation and the second orientation.

17 Claims, 11 Drawing Sheets

(51) Int. Cl.
*B62J 43/10* (2020.01)
*B62J 25/08* (2020.01)
*B62K 15/00* (2006.01)
*B62J 6/02* (2020.01)

(52) U.S. Cl.
CPC ............ *B62J 43/28* (2020.02); *B62K 15/008* (2013.01); *B62K 2202/00* (2013.01)

(58) Field of Classification Search
USPC ......................................................... 180/7.1
See application file for complete search history.

(56) References Cited

U.S. PATENT DOCUMENTS

| | | | |
|---|---|---|---|
| 8,584,782 B2 | 11/2013 | Chen | |
| 8,684,123 B2 | 4/2014 | Chen | |
| 8,830,048 B2 | 9/2014 | Kamen et al. | |
| 9,045,190 B2 * | 6/2015 | Chen | A63C 17/0073 |
| 9,090,274 B1 * | 7/2015 | Arjomand | B62K 15/006 |
| 10,717,491 B1 * | 7/2020 | Neville | B62K 15/008 |
| 10,960,950 B2 * | 3/2021 | Zona | B62K 15/00 |
| 11,077,909 B2 * | 8/2021 | Wang | B62K 11/007 |
| 2003/0042058 A1 | 3/2003 | Chen | |
| 2010/0250040 A1 | 9/2010 | Yamano | |
| 2012/0166056 A1 | 6/2012 | Akimoto et al. | |
| 2013/0033020 A1 | 2/2013 | Arjomand et al. | |
| 2015/0068828 A1 | 3/2015 | Delgatty et al. | |
| 2019/0329837 A1 * | 10/2019 | Ballendat | B62K 11/02 |
| 2020/0008990 A1 * | 1/2020 | Harrison | B62K 5/025 |
| 2021/0009182 A1 * | 1/2021 | Ten Haaft | B62B 5/064 |

FOREIGN PATENT DOCUMENTS

| | | | |
|---|---|---|---|
| CN | 204979012 U | 1/2016 | |
| DE | 10147263 A1 * | 4/2003 | ............... B62J 6/02 |
| DE | 10147263 A1 | 4/2003 | |
| RU | 2090429 C1 | 9/1997 | |

OTHER PUBLICATIONS

Jack Martinich, "Mobi Electric Folding Wheelchair", Tuvie, http://www.tuvie.com/mobi-electric-folding-wheelchair-by-jack-martinich/.

International Search Report and Written Opinion dated Sep. 19, 2016 re Appl. PCT/US2016/37981.

* cited by examiner

PORTABLE ELECTRIC VEHICLE WITH ARTICULATED WHEELS

CROSS-REFERENCE TO RELATED APPLICATIONS

This patent application is a continuation of and claims priority to and all advantages of U.S. Patent Application No. 62/312,001, which was filed on Mar. 23, 2016, which is hereby incorporated by reference in its entirety.

BACKGROUND

Known two-wheeled electric vehicles, such as, by way of example hoverboards and the Segway PT, are challenging for users to transport due to weight and bulk when not in use, reducing their practicality and attractiveness to users and potential users.

DETAILED DESCRIPTION

Introduction

A portable electric vehicle includes a vertical stem and a pair of articulated wheels that are selectively movable relative to the stem between a deployed position and a stored position.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described.

Exemplary System Elements

Figure 1:
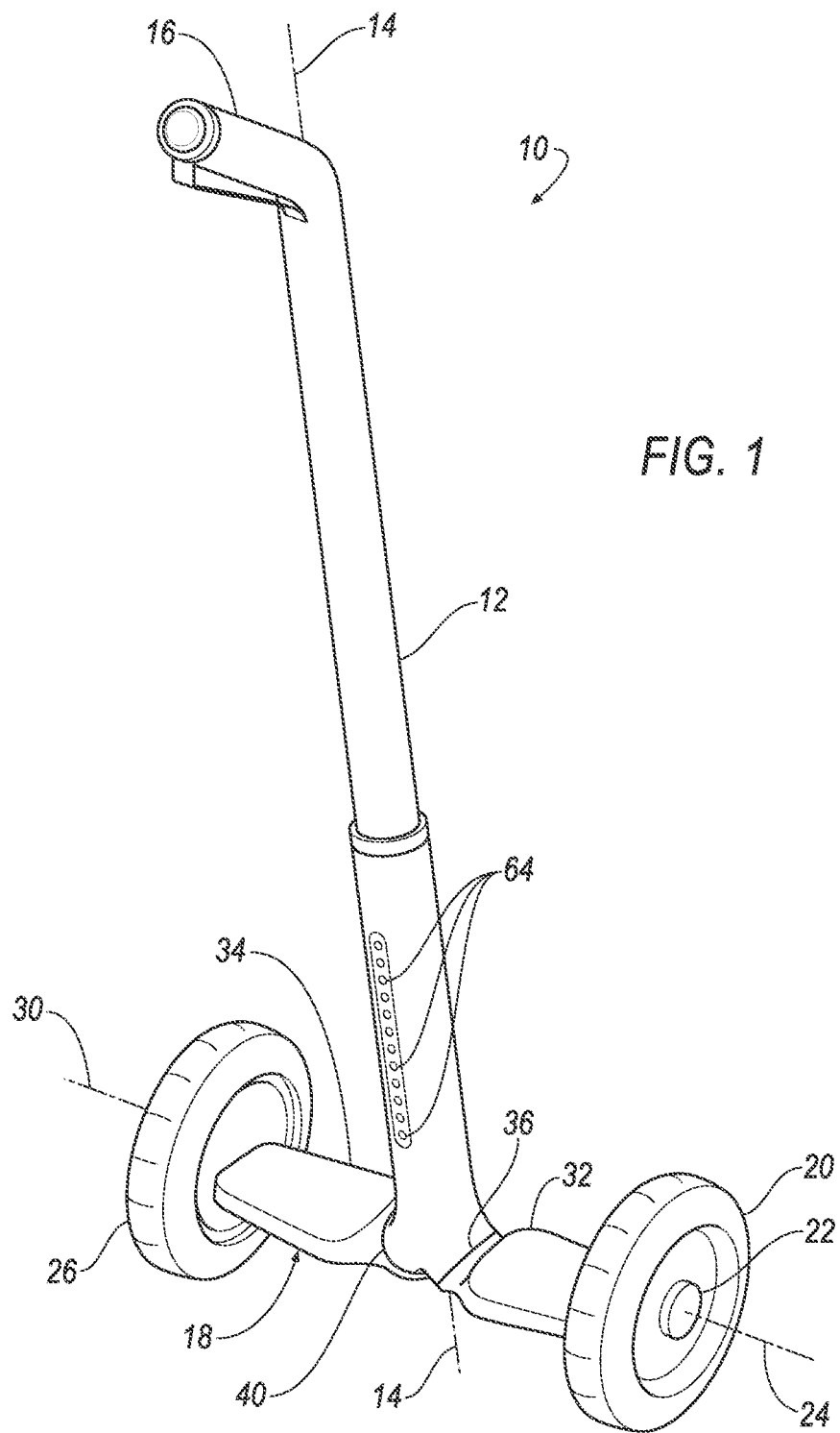
FIG. 1 is a perspective view of an exemplary electric vehicle with its wheels in a deployed position.

FIG. 1 illustrates a portable electric vehicle 10. Vehicle 10 has an elongate stem 12 extending along a central stem axis 14. A handgrip 16 is disposed at a first end of stem 12. A base 18 is disposed at a second end of stem 12, opposite handgrip 16.

Base 18 has symmetrical elements opposed across axis 14. A left wheel 20 is rotatably mounted on a left hub 22. Left hub 22 defines a left axis of rotation 24. A right wheel 26 is rotatably mounted on a right hub 28. Right hub 28 defines a right axis of rotation 30. A left platform 32 defines a substantially planar left footrest. Left platform 32 is disposed between left hub 22 and stem 12. A right platform 34 defines a substantially planar right footrest. Right platform 34 is disposed between right hub 28 and stem 12. Motion command sensors, not shown, may be integrated into platforms 32 and 34. Such motion command sensors may be used for the actuation of forward motion, reverse motion and turning. Exemplary motion command sensors may include strain gauges, spring loaded variable position toggles, footpads that pivot within platforms 32 and 34, and any alternative device for detecting a foot loading bias.

A left platform pivot joint, or left first pivot joint 36, or yet alternatively, left stem-to-platform pivot joint, pivotably connects left platform 32 and stem 12. A left wheel pivot joint, or left second pivot joint 38, or yet alternatively, left platform-to-wheel pivot joint, pivotably connects left hub 22 and left platform 32. A right platform pivot joint, or right first pivot joint 40, or yet alternatively, right stem-to-platform pivot joint, pivotably connects right platform 34 and stem 12. A right wheel pivot joint, or right second pivot joint 42, or yet alternatively, right platform-to-wheel pivot joint, pivotably connects right hub 28 and right platform 34. Each of first pivot joints 36 and 40 has a pivot axis, 37 and 41 respectively, at a pivot angle to axis 14 with pivot angle substantially equal to 45°. Platforms 32 and 34 pivot or rotate about their respective first pivots axis between positions substantially perpendicular to axis 14 and positions substantially parallel to axis 14. Each of second pivot joints 38 and 42 has a pivot axis, 39 and 43 respectively, at a pivot angle to platforms 32 and 34 respectively with the pivot angles substantially equal to 45°. Wheels 20, 26 together with hubs 22, 28 pivot or rotate about their respective pivot axes 39, 43 between positions in which axes of rotation 24 and 30 are substantially perpendicular to platforms 32 and 34 in a retracted orientation or position and are parallel to platforms 32 and 34 in a deployed orientation or position.

Materials for the components, particularly the larger components such as stem 12, handgrip 16, base 18 and platforms 34 and 32, are formed of high strength, low weight materials of cross sections and shapes providing sufficient strength and stiffness. Exemplary materials include but are not limited to composite-reinforced polymers such as graphite fiber materials and aerospace grade aluminum.

The pivot joints 36, 38, 40, 42 allow wheels 20, 26 to be articulated from a deployed position to a retracted position. In the deployed position, one embodiment of pivot joints 36, 38, 40, 42 are manually manipulated to pivot the wheels between the deployed and retracted positions. Such pivot joints may include mechanical detents (not shown) as are known in the art of pivoting mechanisms to retain the pivot joints in the deployed and retracted positions. In an alternative embodiment, pivot joints 36, 38, 40, 42 are actuated to move between the deployed position and the retracted position by electric motors (not shown) responsive to an operator command.

Figure 4:
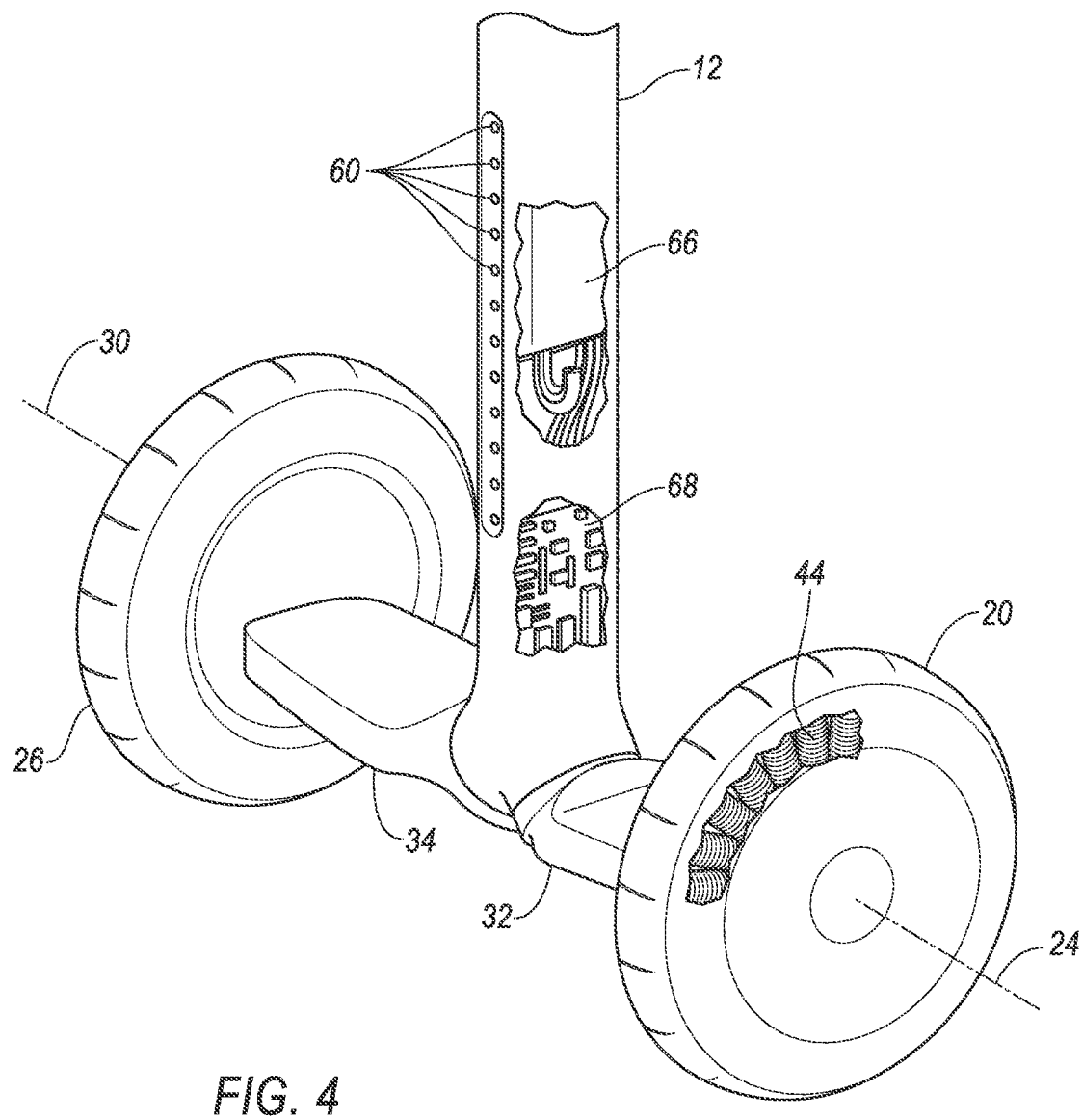
FIG. 4 is an enlarged perspective cut-away view of a lower portion of the electric vehicle of FIG. 1.
Figure 5:
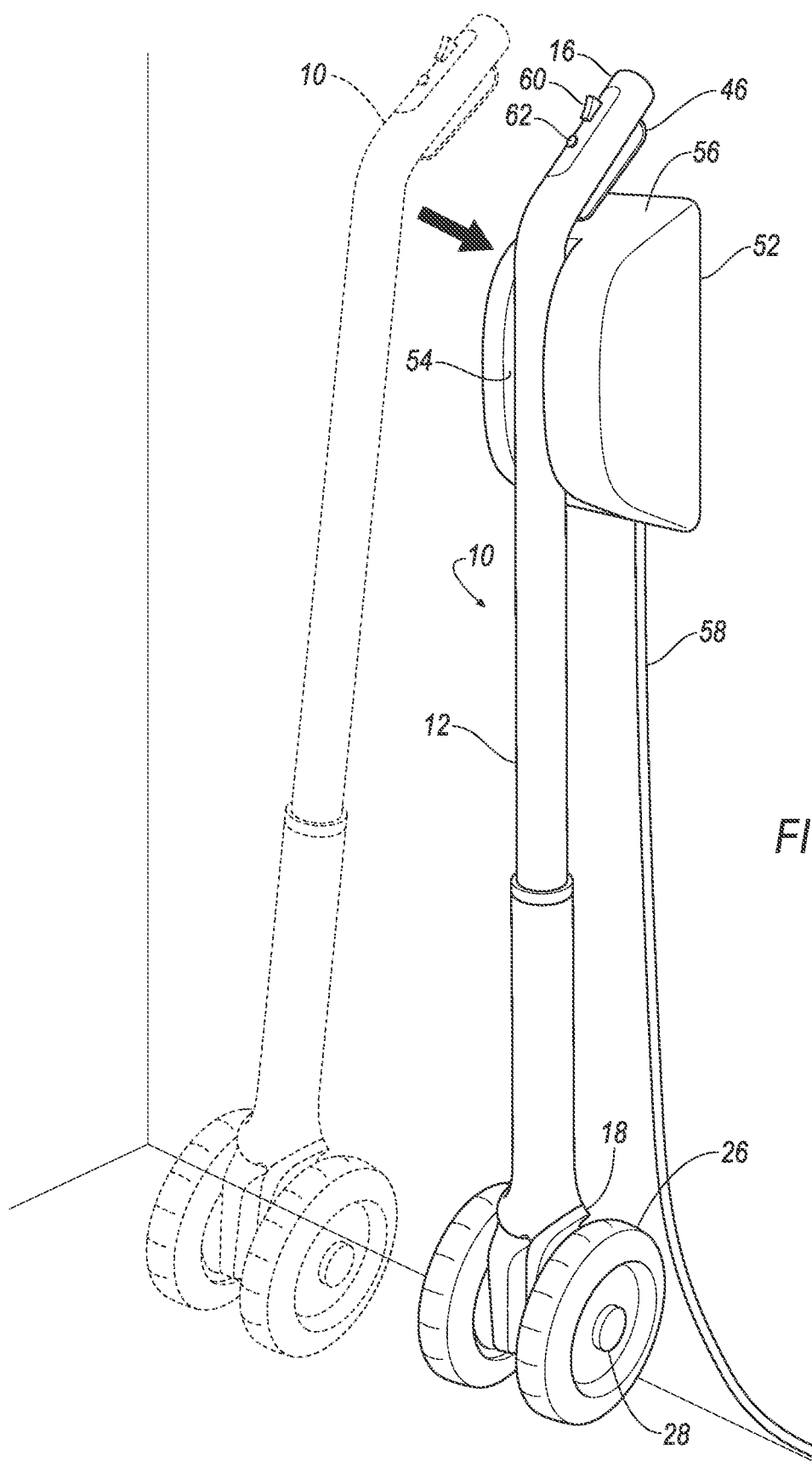
FIG. 5 is a perspective view of the electric vehicle of FIG. 1 mounted in a charging station.

A drive motor 44, shown in part in FIG. 4, is drivingly connected to wheel 20. In the illustrated exemplary embodiment, a rotor portion of motor 44 is integrated into wheel 20. A motor 44 is similarly integrated into wheel 26.

Figure 6:
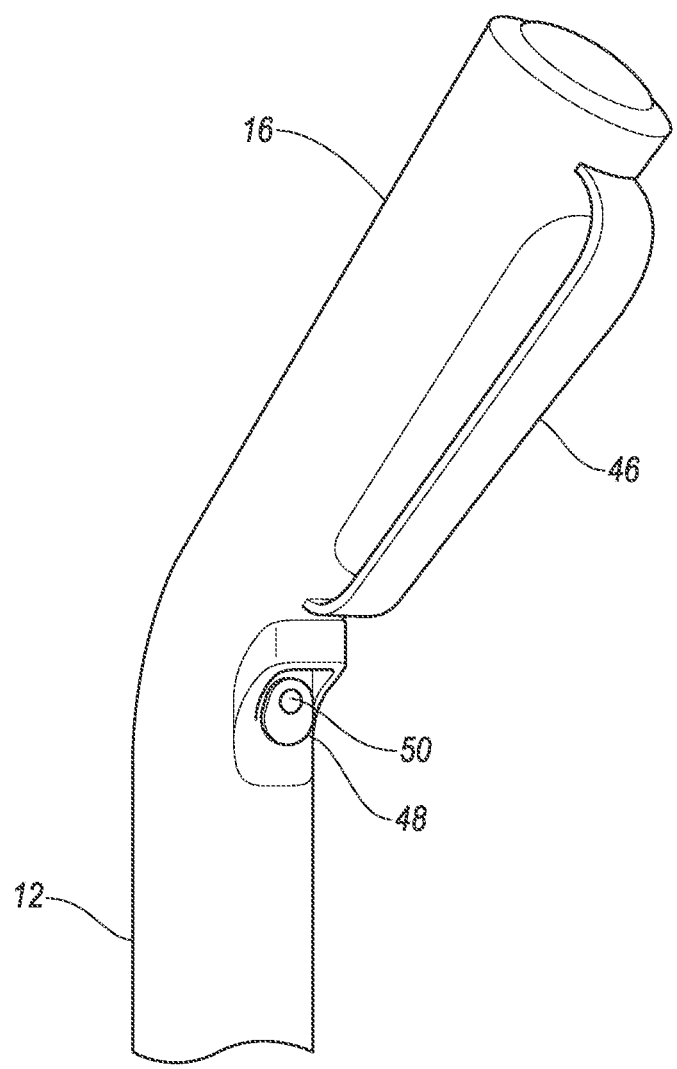
FIG. 6 is an enlarged perspective view of a handgrip of the electric vehicle of FIG. 1.

Exemplary handgrip 16 includes a handgrip strap 46 on a lower side of handgrip 16, as best shown in FIG. 6. A charging port 48 includes a charging terminal 50 disposed below strap 46. Handgrip 16 nests in charger 52 for charging as best shown in FIG. 6. An exemplary charger 52 has a receiving channel 54 therein receiving an upper portion of stem 12. An upper surface 56 of charger 52 is at an angle to receiving channel 54 substantially equal to an angle of the handgrip relative to the stem. Handgrip 16 rests against upper surface 56 when vehicle 10 is engaged with charger 52. A charging connection (not shown) in charger 52 aligns with terminal 50 when vehicle 10 so engages charger 52. A power cord 58 connects charger 52 to an electrical power source, such as an alternating current wall socket (not shown). Also integrated into exemplary handgrip 16 are a power control switch 60 and a light control switch 62. An exemplary power control switch 60 is a toggle switch with an on and an off position.

A plurality of forward lights 64 are disposed on a forward-facing surface of stem 12. Exemplary lights can be employed to serve multiple purposes, including illuminating the path in front of the vehicle, increasing the visibility of the vehicle and it operator to pedestrians and other vehicle operators, and providing an indication of remaining electrical power reserves in a vehicle power accumulator such as a battery or super capacitor or ultracapacitor, with the number of lights illuminated decreasing with the amount of reserve power.

As best seen in FIG. 4, an exemplary electrical power accumulator in the form of a lithium-ion battery 66 is disposed inside of stem 12 above base 18. Alternative forms of electrical power accumulators include super capacitors, ultra-capacitors, and other forms of batteries as are available. Also substantially disposed in stem 12 is an exemplary electric control unit 68 (ECU) for managing power in vehicle 10 and for operating the vehicle systems including the vehicle motors 44. Motors 44 are electrically connected to and controlled by ECU 68. ECU 68 is also electrically connected to the sensors in platforms 32 and 34. Signals or data from the motion command sensors in platforms 32 and 34 is input to ECU. ECU 68 bases commands to motors 44 for all motion of vehicle 10 on signals or data from the sensors in platforms 32 and 34. Such motion includes forward motion, backwards motion, and turning motions. Forward motion is achieved by rotating both motors at substantially the same speed in a forward direction. Backwards motion is achieved by rotating both motors at substantially the same speed in a rearward direction. Turning motion is achieved by rotating the motors at appreciably different relative speeds. The relative speed differential can affect a turning radius diameter. By way of example, rotating both motors in the same direction with one motor rotating appreciably faster than the other motor results in an arcing turn; rotating just one motor causes vehicle 10 to essentially pivot about the non-rotating wheel; and rotating the wheels 20 and 26 in opposite directions at equal speed pivots vehicle 10 about a vertical vehicle axis (not shown) midway between wheels 20 and 26.

Figure 7:
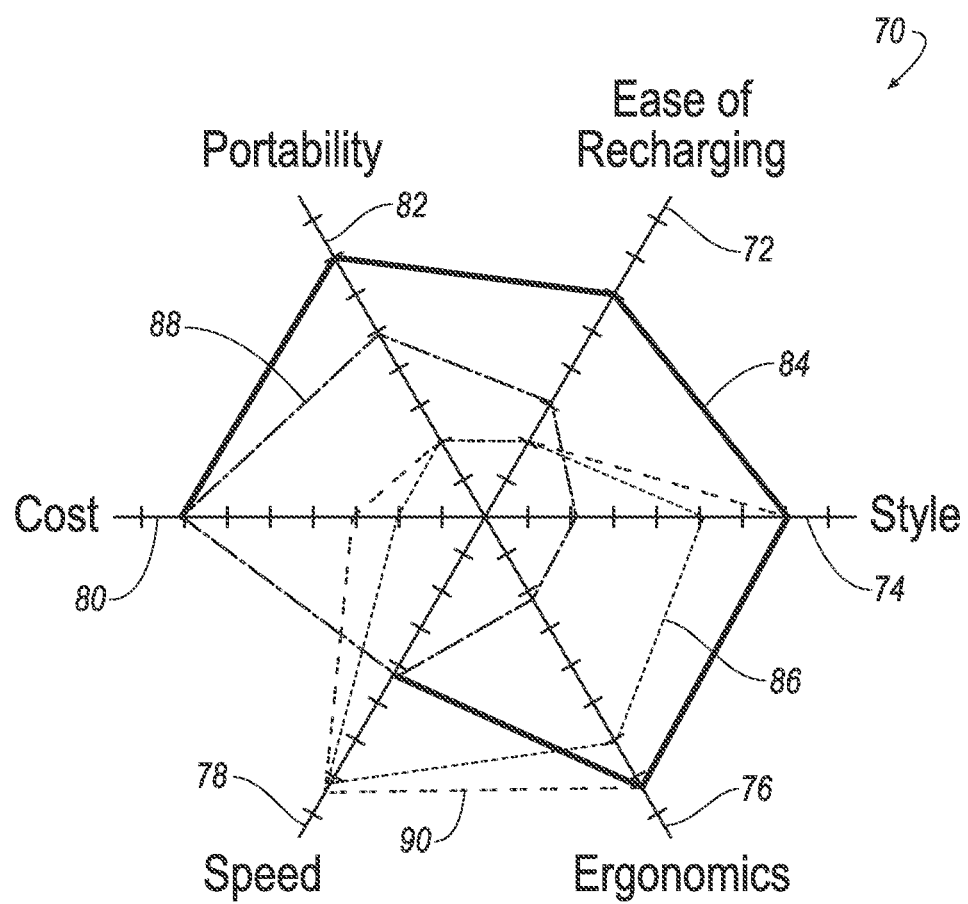
FIG. 7 is a comparative spider chart comparing the presently disclosed electric vehicle with alternative electric vehicles.

FIG. 7 presents a spider comparison chart 70 comparing four different types of two-wheeled electric vehicles. Chart 70 has six different axes for key aspects of electric vehicles: Ease of Recharging 72, Style 74, Ergonomics 76, Speed 78, Cost 80, and Portability 82. The further the attribute is plotted from the center, the more positive the ranking. Four vehicles ranked on the chart are shown with separate traces, including traces for the presently disclosed vehicle 84, a Segway PT 86, a generic hoverboard 88, and an electrically powered bicycle 90.

Processing

In operation, vehicle 10 has its wheels extended outward in the deployed position or orientation best seen in FIG. 1. To use vehicle 10, an operator mounts first turns it on using power control switch 60. Switch 60 may be located on an operator-facing or upper surface of handgrip 16, making it easy for the operator to turn off the vehicle while riding. Once the vehicle is turned on, the operator mounts it from a rear side, stepping on platforms 32 and 34 in a manner similar to mounting a hoverboard. The motors 44, in combination with sensors within vehicle 10 and control logic stored in the memory of ECU 68, maintain vehicle 10 in an upright position with the operator astride. The operator holds handgrip 16 with either his left hand or his right hand. In an exemplary control scheme, the operator causes vehicle 10 to move forward by slightly his tilting body weight forward to load the motion command sensors in platforms 32 and 34 and causing motors 44 and thus wheels 20 and 26 to rotate forward. Vehicle 10 is directed to stop by slightly tilting the operator's body weight back, loading the motion command sensors accordingly, with ECU 68 directing motors 44 to rotate in reverse. In the same exemplary control scheme, turns to the left and right can be achieved by varying the rotation of the left and right motors. By pressing a forward portion or toe area or heel area of one of the platforms 32 and 34 more than the other and loading the associated motion command sensor or sensors, vehicle 10 will turn in the opposite direction. For example, providing a forward bias on the right platform 34 results in a left turn. Sharper turns can be achieved by combining opposite biases. For example, a rear bias on the left platform 32 and a forward bias on the right platform results in a comparatively sharp left turn or a pivoting about the center axis of the vehicle 10. An alternative approach to signaling turns includes installing strain sensors in stem 12 and using the strain sensors to determine lateral loads on stem 12 provided by operator. In this alternative embodiment, ECU directs vehicle 10 to turn in the direction of a force applied to handgrip 16.

Stopping vehicle 10 is easily achieved by leaning in a direction opposite the direction of motion. For example, forward motion is stopped by holding handgrip 16 and leaning back, in a reining motion. Another way to stop the vehicle is to simply step off the vehicle. Yet another way to stop vehicle 10 is to flip switch 60 to the off position. Vehicle 10 slows to a stop while maintaining its balance before power is shut down.

Figure 2:
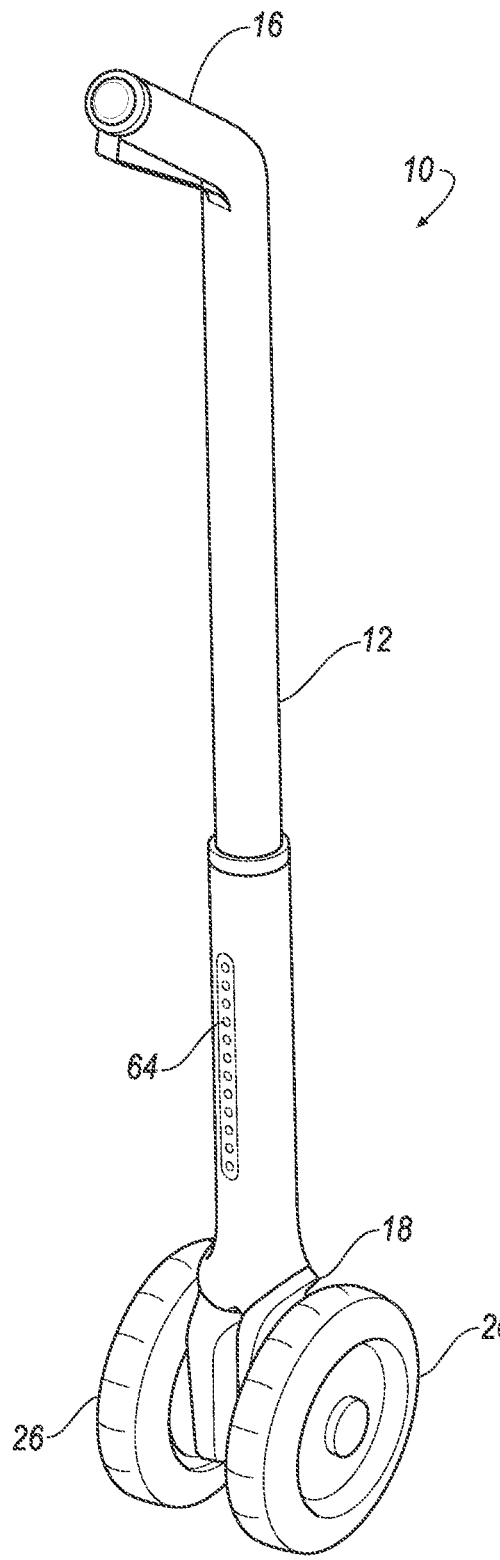
FIG. 2 is a perspective view of the electric vehicle of FIG. 1 with the wheels in a retracted position.
Figure 3A:
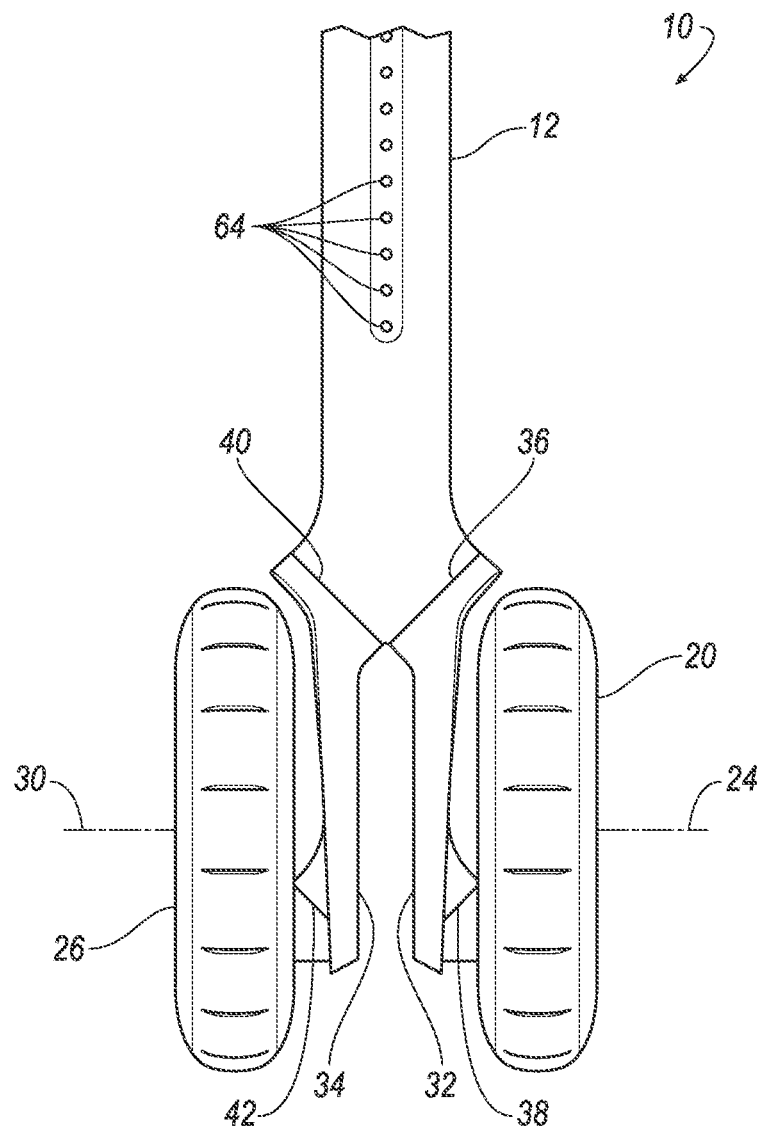
FIG. 3A is a front view of a lower portion of the electric vehicle of FIG. 1 with the wheels in the retracted position.
Figure 3B:
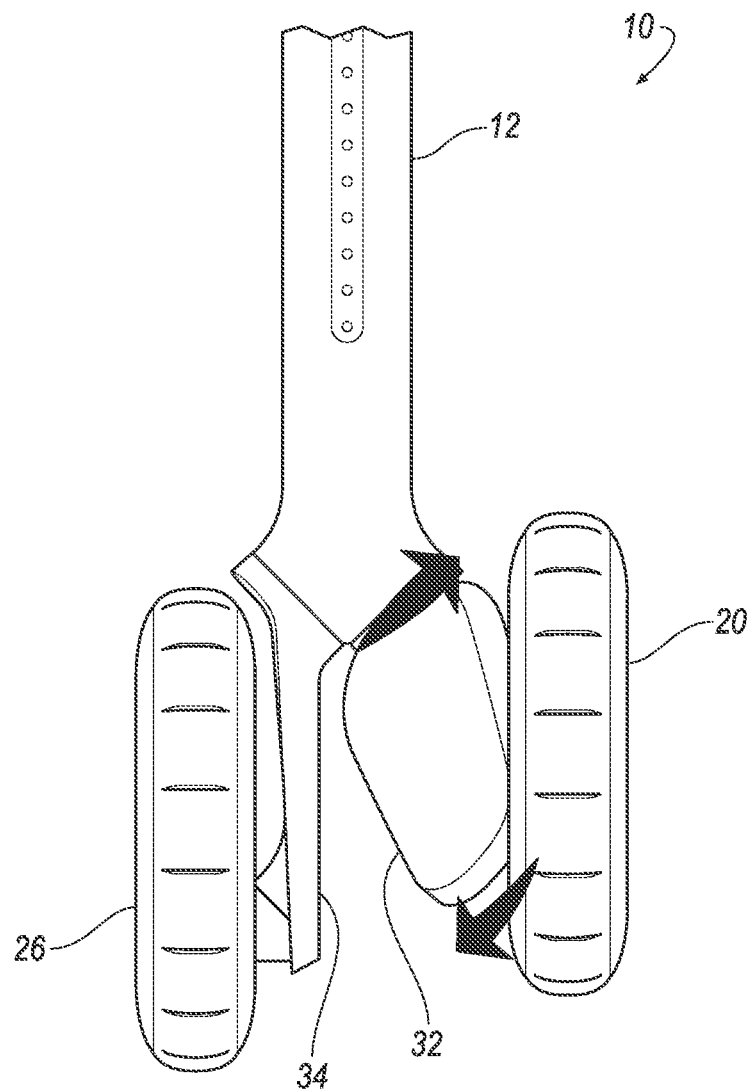
FIG. 3B is a front view of a lower portion of the electric vehicle of FIG. 1 with the left wheel in a transition position moving from the retracted position to the deployed position.
Figure 3C:
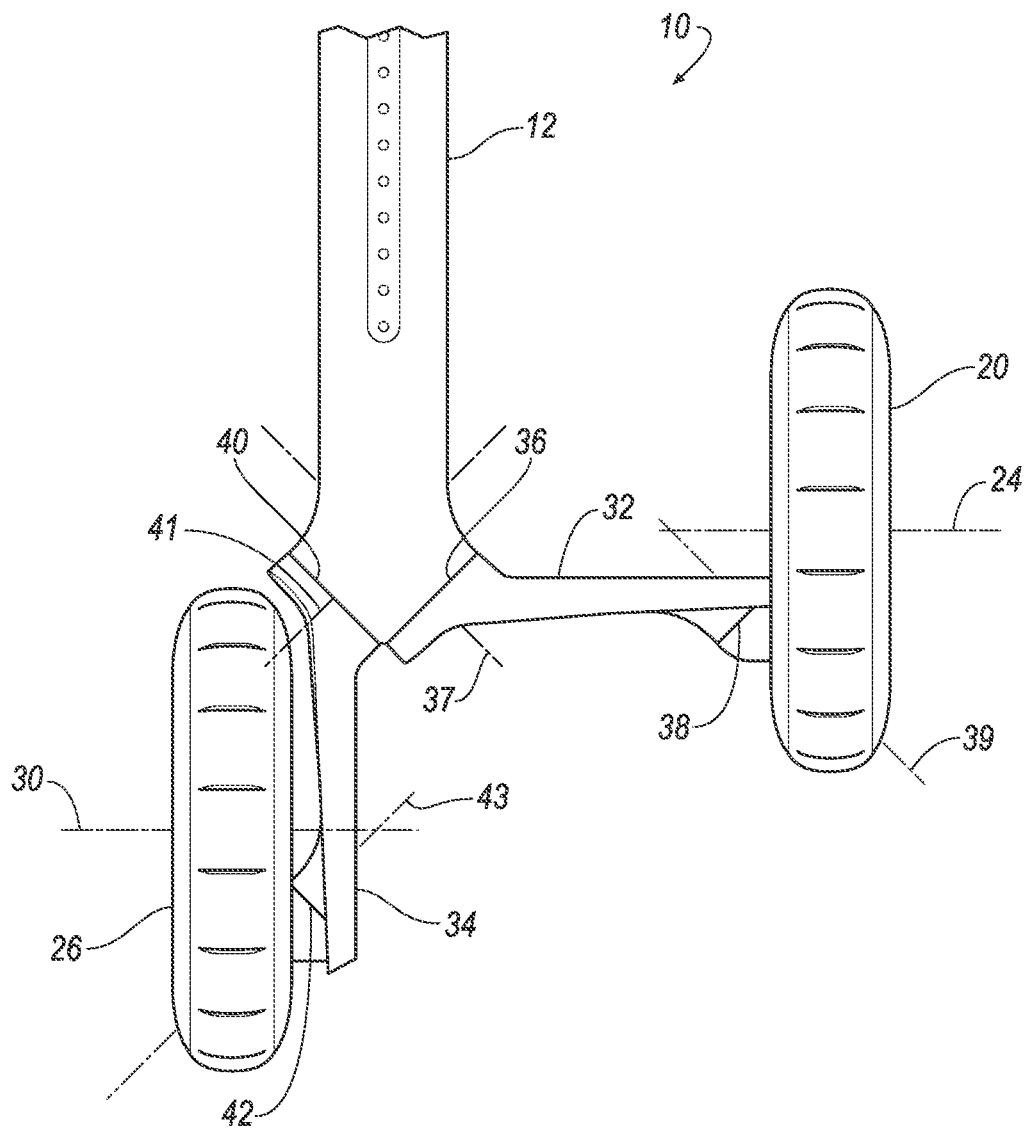
FIG. 3C is a front view of a lower portion of the electric vehicle of FIG. 1 with the left wheel in the deployed position.
Figure 3D:
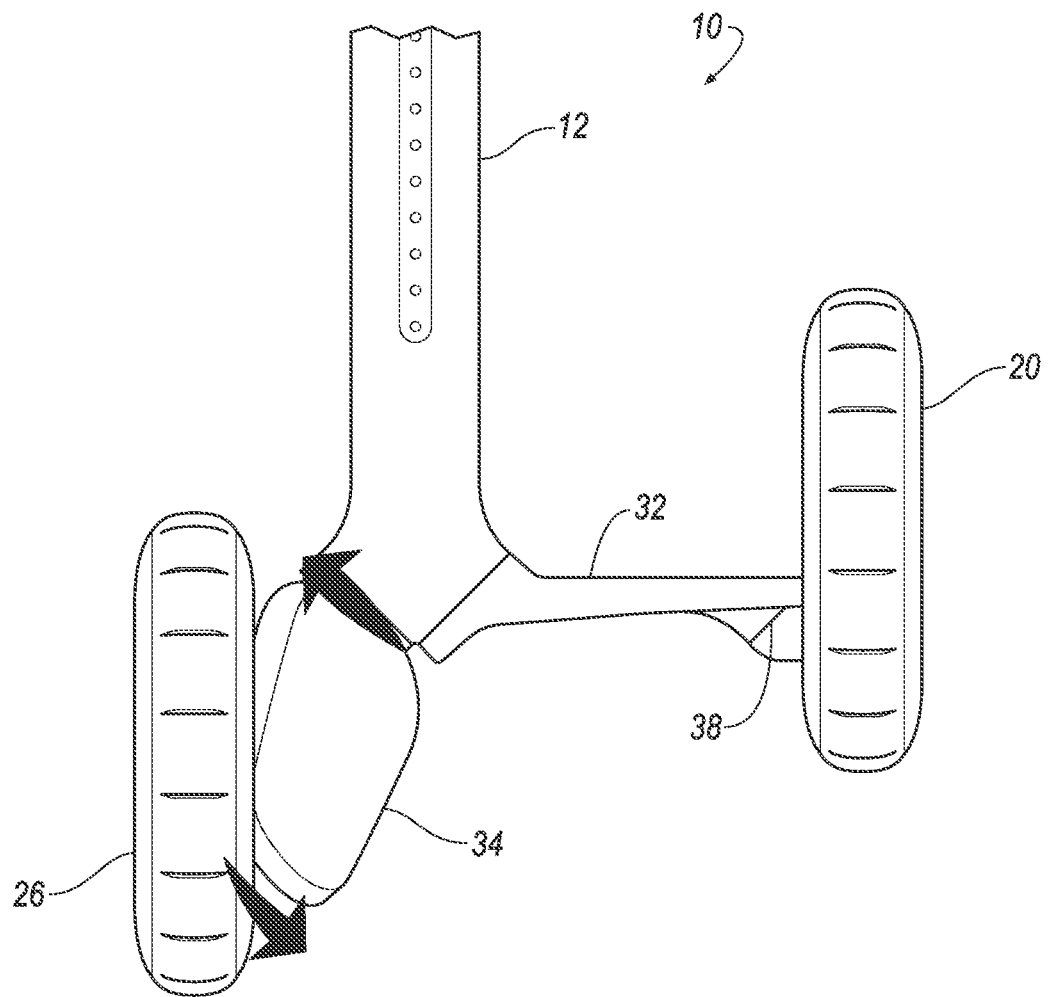
FIG. 3D is a front view of a lower portion of the electric vehicle of FIG. 1 with the right wheel in a transition position moving from the retracted position to the deployed position.
Figure 3E:
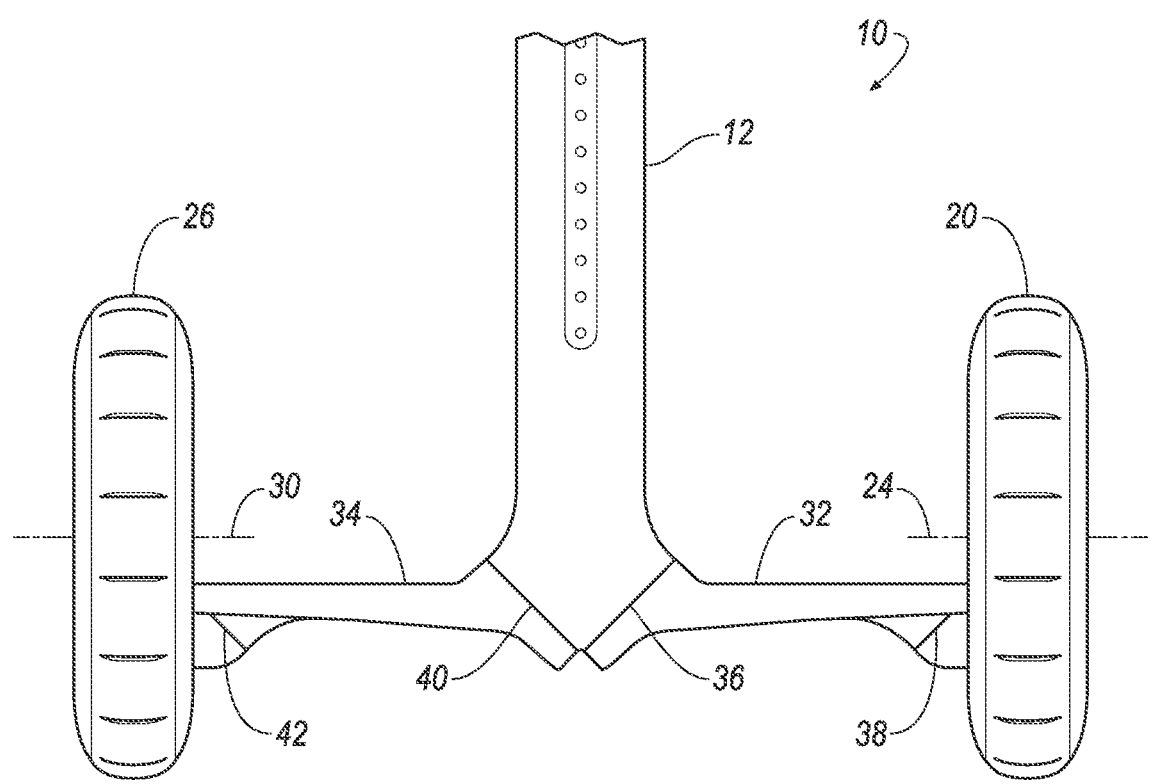
FIG. 3E is a front view of a lower portion of the electric vehicle of FIG. 1 with the right wheel in the deployed position.

When not being used for transportation purposes, vehicle 10 is easily transported by simply rolling it on the ground. The handgrip 16 is most easily used to push vehicle 10 in a rearward direction, relative to the driving orientation. When the full width of vehicle 10 with wheels 20 and 26 in the deployed position makes transporting vehicle 10 difficult due to crowded walkways or otherwise limited space, platforms 32, 34 and wheels 20, 26 are best folded up to the retracted position of FIG. 2. A simple twisting of pivot joints 36, 38, 40, and 42 converts vehicle 10 to a size no larger than a folded umbrella stroller of the type used for small children. Each of pivot joints 36, 38, 40, and 42 are at an angle of 45° to axis 14. With all of the joints pivoted to the axes of rotation 24 and 30 remain aligned, enabling wheels 20 and 26 to roll freely in both the deployed position and the retracted positions.

The 45° angle of first pivot joints 36 and 40 allows platforms 32 and 34 to rotate or pivot from the deployed position in which platforms 32 and 34 are substantially perpendicular or normal to axis 14 to the retracted position or orientation substantially parallel to axis 14. Rotating each of platforms 32 and 34 180° about their respective pivot axes 37, 41 results in platforms 32 and 34 being oriented or positioned substantially parallel to axis 14, with the formerly upper surfaces of each of platforms 32 and 34 facing each other across axis 14.

If only platforms 32 and 34 are pivoted, wheels 20 and 26 have their respective axes of rotation 24 and 30 oriented parallel to axis 14, with a resultant position of wheels 20 and 26 unsuited to providing rolling support of vehicle 10 in the retracted position. The 45° angle of second pivot joints 38 and 42 allows wheel hubs 22 and 28, together with wheels 20 and 26, to rotate or pivot from a deployed position in which axes 24 and 30 are substantially parallel to platforms 32 and 34 to a retracted position in which axes 24 and 30 are substantially perpendicular to platforms 32 and 34. When platforms 32 and 34 and wheels 20 and 26 are each in their respective retracted positions, axes 24 and 30 are substantially perpendicular to axis 14. Rotation of left hub 22 and left wheel 20 180° about the associated second pivot axis 39 results in axis 24 being oriented or position substantially perpendicular to left platform 32. Likewise, rotation of right hub 28 and right wheel 26 180° about the associated second pivot axis 43 results in axis 30 being oriented or position substantially perpendicular to right platform 34.

Charging of vehicle 10 can be conveniently done in the vehicle storage rack, with charger 52 serving a secondary purpose as the storage rack. Alternatively configured chargers suited for placement in larger passenger vehicles such as in the trunk of a car or the rear stowage area of a light truck, and using the available 12 volt power in the larger vehicle for charging.

CONCLUSION

An electric vehicle with articulated wheels has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to computers in the present description, computing devices such as the ECU discussed herein generally each include instructions executable by one or more computing devices such as those identified above, and for carrying out process blocks or steps of processes described above. For example, process blocks as discussed above are embodied as computer executable instructions.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the processes, systems, methods, etc. described herein, it should be understood that, although the steps of such processes, etc. relating to the deployment and use of electric vehicles have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An electric vehicle comprising:
   a stem having a stem axis; and
   a base at a first end of the stem having substantially symmetrical elements opposed across the stem axis with the elements on each side including:
   a wheel having an axis of rotation,
   a drive motor connected to the wheel,
   a platform between the wheel and the stem,
   a first pivot joint connecting the stem and the platform, and
   a second pivot joint connecting the platform and the wheel;

wherein the platforms in a first orientation are substantially perpendicular to the stem axis and in a second orientation are substantially parallel to the stem axis, and the axes of rotation of the wheels are substantially parallel to each other and are substantially perpendicular to the stem axis in the first orientation and the second orientation, and wherein the first pivot joints are 45° to the stem axis and the second pivot joints are 45° to the platform.

2. The electric vehicle of claim 1, further comprising a handgrip at a second end of the stem opposite the base.

3. The electric vehicle of claim 1, wherein an electrical power storage unit is disposed within the stem.

4. The electric vehicle of claim 1, wherein an electronic control unit is substantially disposed within the stem.

5. The electric vehicle of claim 1, wherein a plurality of forward lights are disposed in a forward facing surface of the stem.

6. The electric vehicle of claim 1, wherein the drive motor is integrated into the wheel.

7. The electric vehicle of claim 2, wherein a power control switch electrically connected to the electronic control unit is fixed to the handgrip.

8. An electric vehicle system comprising:
an electric vehicle including:
a stem extending along a stem axis, and
a charging port integrated into the stem of the vehicle,
a base at a first end of the stem having symmetrical elements opposed across the stem axis with the elements on each side including:
a wheel rotatably having an axis of rotation,
a drive motor connected to the wheel,
a platform between the wheel and the stem,
a first pivot joint connecting the stem and the platform, and
a second pivot joint connecting the platform and the wheel;
wherein in a first pivoted orientation the platforms are substantially perpendicular to the axes of rotation of the wheels and in a second orientation are substantially parallel to the stem axis, and the axes of rotation of the wheels are substantially parallel to each other and are substantially perpendicular to the stem axis in the first orientation and the second orientation; and a charger for the electric vehicle including a housing receiving the vehicle and electrically engaging the charging port.

9. The electric vehicle system of claim 8, further comprising a handgrip at a second end of the stem opposite the base.

10. The electric vehicle system of claim 9, wherein the charger has a receiving channel therein receiving an upper portion of the stem and an upper surface at an angle to the receiving channel substantially equal to an angle of the handgrip relative to the stem.

11. The electric vehicle system of claim 8, wherein an electrical power storage unit is disposed within the stem.

12. The electric vehicle system of claim 11, wherein an electronic control unit is substantially disposed within the stem.

13. The electric vehicle system of claim 8, wherein a plurality of forward lights are disposed in a forward facing surface of the stem.

14. The electric vehicle system of claim 8, wherein the drive motor is integrated into the wheel.

15. The electric vehicle system of claim 8, wherein the first pivot joints are 45° to the stem axis and the second pivot joints are 45° to the platform.

16. An electric vehicle comprising:
an elongate stem; and
a base having opposing symmetrical elements across the elongate stem including:
a wheel having an axis of rotation,
a motor connected to the wheel,
a platform between the wheel and the elongate stem,
a stem to platform pivot joint, and
a platform to wheel pivot joint;
wherein the axes of rotation of the wheels are parallel to each other and are perpendicular to the elongate stem in a deployed orientation and a retracted orientation, and wherein the stem to platform pivot joints are 45° to the stem and the platform to wheel pivot joints are 45° to the platform.

17. The electric vehicle of claim 16, wherein an electrical power storage unit is substantially disposed within the elongate stem and an electronic control unit is substantially disposed within the elongate stem.

* * * * *